United States Patent Office 2,977,535
Patented Mar. 28, 1961

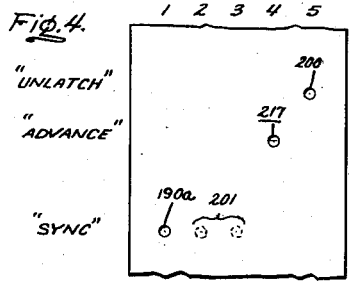
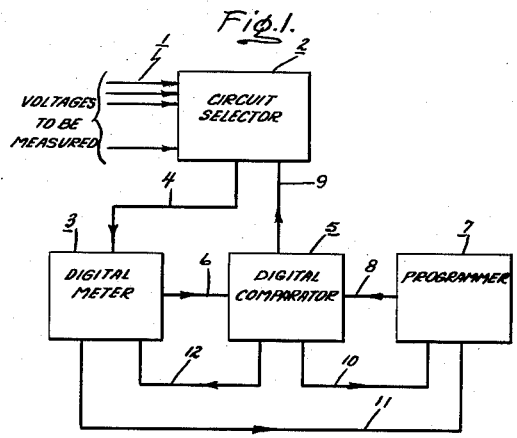
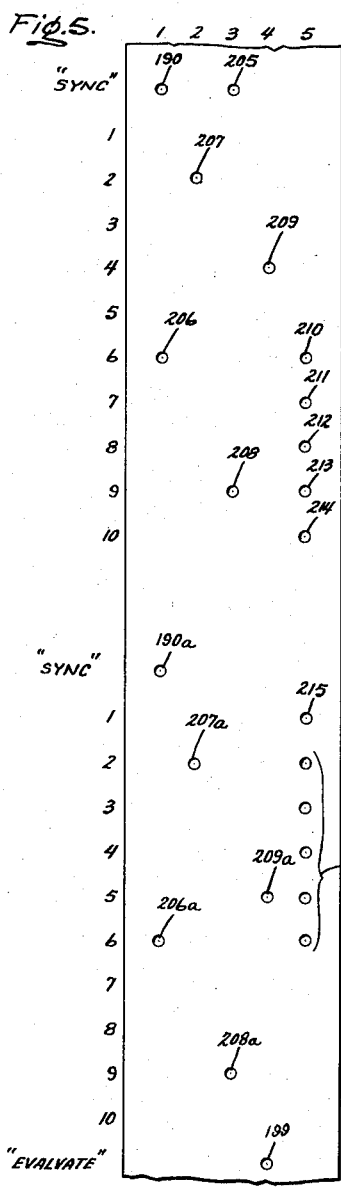
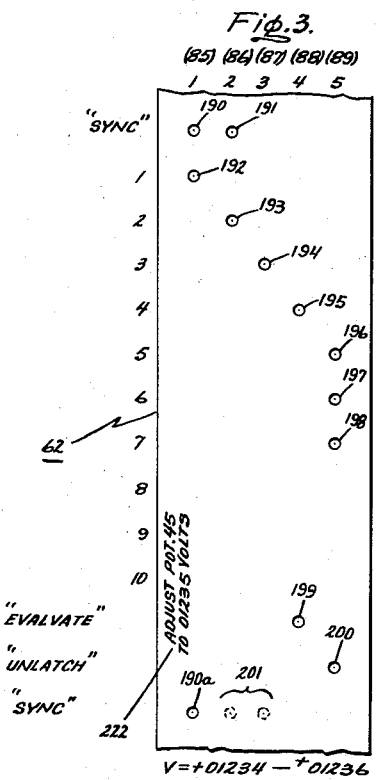

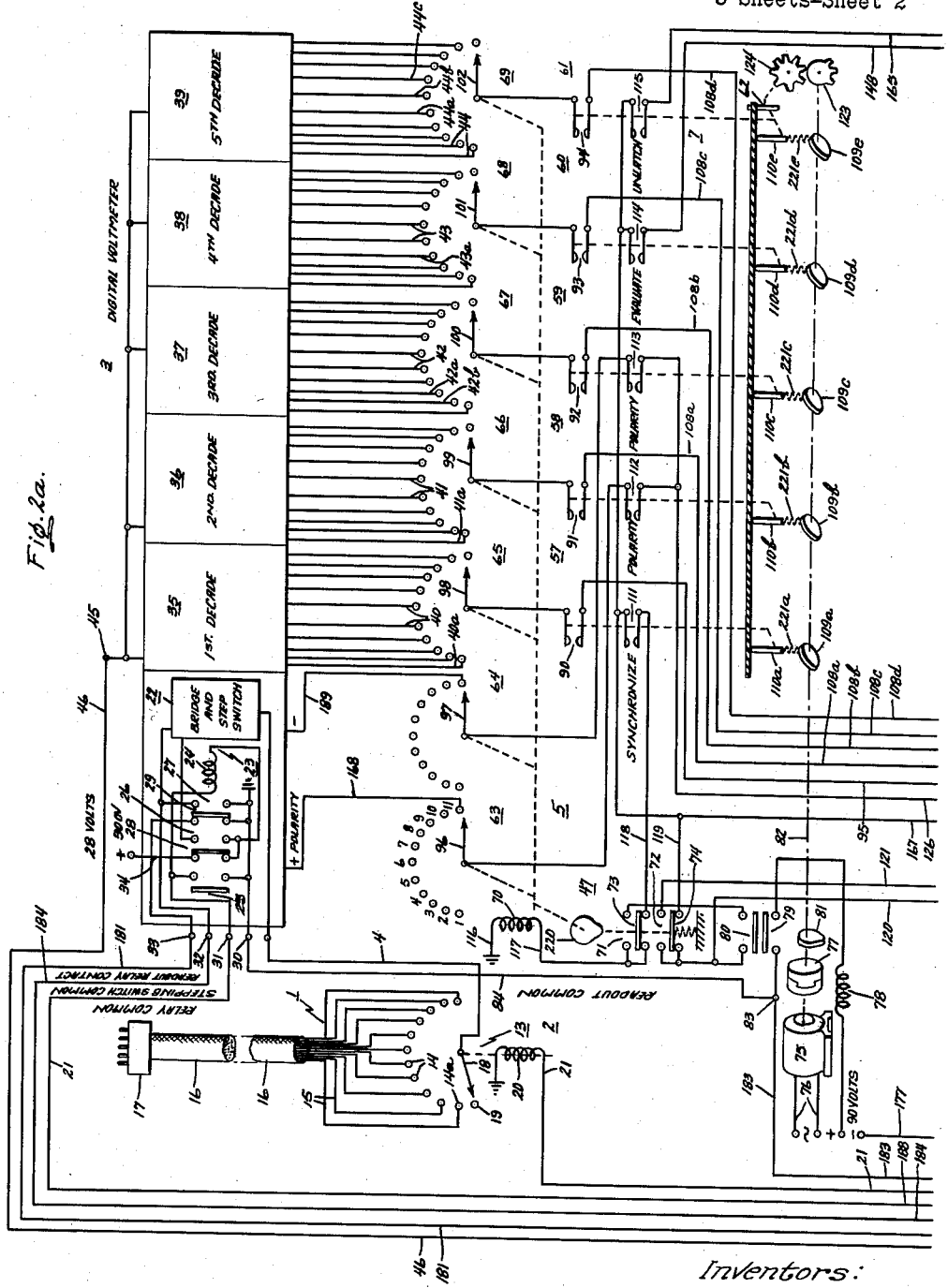

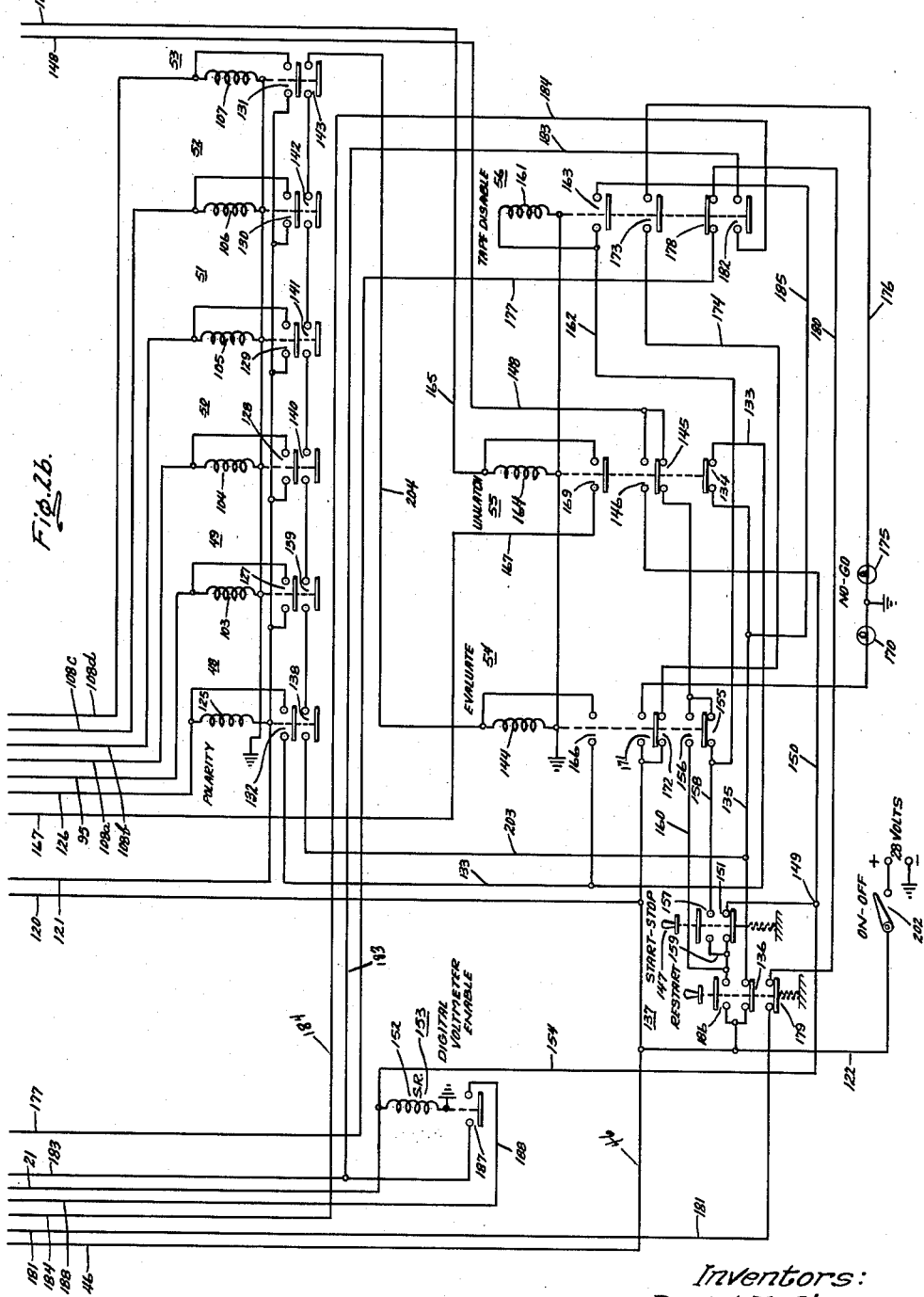

2,977,535

AUTOMATIC DIGITAL EVALUATOR

David T. O'Connor, New Haven, and Robert A. Fabish, Fort Wayne, Ind., assignors to International Telephone and Telegraph Corporation Filed Aug. 20, 1958, Ser. No. 756,098

13 Claims. (Cl. 324—73)

This invention relates to electrical testing apparatus, and more particularly to a system for automatically and sequentially selecting, measuring and evaluating a plurality of parameters which can be reduced to electrical quantities and converted to digital form.

Electronic equipment, such as computers, automated industrial apparatus and modern weapons systems, is becoming increasingly complex with a consequent increase in the requirement for repair, maintenance, and confidence testing. Such complex electronic equipment is customarily serviced by making many precise measurements of various parameters within the equipment, such as voltages, currents, resistances, and frequencies. These precision measurements have in the past been individually and separately made by the service technician physically connecting appropriate test leads to the component or circuit element to be tested, and then proceeding with the required test; the complexity of the equipment and the number and variety of the measurements involved have accordingly required increased skill and training on the part of such servicing personnel. In addition, with such prior measurement techniques, an exorbitant amount of time was involved in conducting a complete test on a complex apparatus, and the possibility of human error was always present due particularly to the operator tedium inherently present in the task of measuring a great number of parameters consecutively.

It is therefore highly desirable to provide a system for automatically and sequentially selecting a large number of parameters to be measured, performing the measurements and evaluating the results to determine whether they respectively correspond to required values. It is further desirable that such a system perform such measurements at a high rate of speed compared with the previous manual measurements, and that the system provide flexibility relative to the number of tests which can automatically be conducted consecutively. It is still further desirable that such a system accommodate a relatively wide range of tolerances which may be applied automatically and individually to the parameters measured. It is additionally desirable that such a system perform measurements by making comparisons digitally in order to eliminate problems of drift or instability and the requirement for calibration. It will be seen that such a system will permit the testing of complex electrical apparatus in much less time than was previously required, will reduce human error, and will require substantially less operator training.

In accordance with the broader aspects of our invention therefore, we provide a system for automatically and sequentially selecting, measuring and evaluating a plurality of parameters capable of reduction to characteristics and electrical quantities and of conversion to digital form; the term "characteristics" as here employed includes but is not necessarily limited to such characteristics as polarity, range, alternating current voltage, direct current voltage, ohms, decimal point, etc. Our system comprises means for transferring such characteristics and converting the electrical quantities to digital form with means for sequentially connecting the converting means to a plurality of sources of the parameters to be measured and evaluated. Means are provided coupled to the converting means for comparing the output thereof with preselected required characteristics and electrical quantities in digital form, the comparing means being coupled to the connecting means and arranged to advance the same to connect the converting means to the next electrical quantity source responsive to a coincidence of a converting means output and a corresponding required characteristic and electrical quantity. More particularly, we provide programming means, for example, of the type utilizing a punched tape, coupled to the comparing means for sequentially supplying the preselected required characteristics and electrical quantities in digital form thereto. In the preferred embodiment of our invention, the comparing means is provided with a coupling to the programming means for disabling the same responsive to a lack of agreement of a converting means output and a corresponding required characteristic and electrical quantity thereby to stop the conduct of consecutive selections and measurements to permit ascertainment and correction of the fault. Since the occurrence of an undesired characteristic and/or electrical quantity which results in stopping of the otherwise automatically conducted testing will generally result from improper adjustment of a component in the system being tested, the location of the component to be adjusted in order to correct the fault may be printed on the tape. Thus, in the event that testing is stopped as a result of a lack of agreement of a converting means output and a corresponding required characteristic and electrical quantity, the operator need only inspect that portion of the tape then in the tape reading means to ascertain the location of the component to be adjusted in order to secure the desired characteristic and/or electrical quantity.

It is accordingly an object of our invention to provide means for automatically and sequentially selecting, measuring and evaluating a plurality of parameters capable of reduction to characteristics and electrical quantities.

Another object of our invention is to provide a system for automatically and sequentially selecting, measuring and evaluating a plurality of parameters capable of reduction to characteristics and electrical quantities and conversion to digital form which includes transfer of the characteristic and conversion of the electrical quantities to digital form and programming of the required characteristics and electrical quantities in digital form for comparison with the characteristic and electrical quantities being measured.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a block diagram schematically illustrating the basic concept of our invention;

Figs. 2A and 2B are schematic circuit diagrams of our automatic digital evaluator; and Figs. 3, 4 and 5 illustrate sections of sample punched tapes utilized in programming various tests on the apparatus of Figs. 2A and 2B.

Referring now to Fig. 1, the parameters to be measured, such as voltages or frequencies, or voltages corresponding to resistances or currents are brought out from the apparatus being tested by a plurality of test circuits 1. A circuit selector 2, which will be more fully described hereinafter, is provided for sequentially connecting the circuits 1, one at a time, to the input circuit of digital meter or converter 3 by means of connection 4. Meter 3 may be a digital voltmeter, digital ammeter, digital ohmmeter, digital frequency meter, or and other digital converter depending on the quantity to be evaluated. Any combination of digital converters may be used in any given system in accordance with our invention depending upon the different parameters to be measured. Furthermore, a number of voltage transducers may be used in conjunction with a digital voltmeter in order to accomodate different types of parameters in a single system. The digital meter 3 converts the test quantity impressed thereon from a circuit selector 2 to digital form; digital converters are well known in the art and are commercially available. A digital comparator or coincidence scanner 5 is provided coupled to the output circuits of digital meter 3 by connection 6 and also coupled to programmer 7 by connection 8; digital comparator 5 compares the digital output from the digital meter 3 with a preselected required quantity in digital form provided by the programmer 7. Digital comparator 5 is also coupled to the circuit selector 2 by a connection 9 and if its evaluation of the comparison of the digital output of the digital meter 3 and the digital information provided by the programmer 7 finds the desired coincidence, digital comparator 5 is arranged to advance the circuit selector 2 so as to connect the next consecutive circuit 1 to the digital meter 3. Digital comparator 5 is also connected to programmer 7 by another connection 10 and is arranged to stop the programmer 7 and thus the testing responsive to a lack of the desired coincidence between the digital output of the digital voltmeter 3 and the digital information from the programmer 7 as evaluated by digital comparator 5. Digital meter 3 is also connected to programmer 7 by a connection 11 and is arranged to initiate operation of the programmer responsive to the digital meter 3 having completed measurement of the quantity impressed thereon from the circuit selector 2. Digital comparator 5 is also connected to digital meter 3 by a connection 12 and is arranged to initiate a new measurement by the digital meter 3 of the next successive quantity provided from circuit selector 2 responsive to coincidence of the digital output from digital meter 3 and the digital information from programmer 7 as compared and evaluated by the digital comparator 5.

Referring now to Figs. 2A and 2B which show a digital voltage evaluator, it will be seen that the circuit selector 2 in the preferred embodiment of our invention takes the form of a conventional stepping switch 13 having its contacts 14 connected respectively to the input circuits 1; stepping switch 13 when energized with a recurring step-function voltage selects the voltage to be measured at a particular step in the test sequence, as will be hereinafter more fully described. It will be seen that the conductors 15 constituting the input circuits 1 may be brought out through a suitable cable 16 to a suitable connector 17, which in turn may be plugged into a cooperating connector on the equipment to be tested, the leads bringing out the voltages to be measured being connected to such cooperating connector. The wiper arm 18 of the stepping switch 13 has a home position 19 and is connected to digital voltmeter 3 by means of the connection 4. Wiper arm 18 of the stepping switch 2 is actuated by operating coil 20 having one end connected to ground and its other end 21 connected for energization as will be hereinafter more fully described.

In constructing the preferred embodiment of this invention, we have employed a digital voltmeter catalog No. 5400 PS-1, manufactured by the Electro-Instruments Company. The digital voltmeter 3 incorporates an automatically balancing bridge wherein balance is attained by selecting different values of precision resistors in one arm of the bridge by means of a stepping switch. The stepping switch is driven by a step function voltage derived from a chopper amplifier; the chopper amplifier input voltage is the bridge unbalance voltage, therefore, when the bridge is balanced there is no input to the chopper amplifier and the stepping switch remains at rest. An additional level on each of the five bridge stepping switches is energized with twenty-eight (28) volts direct current on its wiper arm. Since the digital voltmeter 3 is a commercial item and does not form a part of our invention, the bridge and stepping switch portion thereof is shown in block form at 22. The connection 4 from the wiper arm 18 of the selector switch 2 is brought into the bridge and step switch 22 in the digital voltmeter 3. External control of the digital voltmeter 3 and control of the operation of external circuitry to be hereinafter described is provided by an internal control relay 23. Control relay 23 has an operating coil 24 with normally open contacts 25, 26 and 27 and normally closed contacts 28 and 29 actuated thereby. One side of contacts 25, 29 and 27 are connected to ground and to an external terminal 30, designated as the "read-out common" terminal. One side of the operating coil 24 of relay 23 is connected to the other side of contact 25 and to an external terminal 31, designated as the "relay common" terminal. The other side of the operating coil 24 of relay 23 is connected to one side of contacts 28 and 26 and a connection to the stepping switch within the bridge and stepping switch circuit 22 is made to the other side of contact 27 and also to external terminal 32, designated as the "stepping switch common" terminal. The other side of contact 29 is brought out to external terminal 33, designated as the "read-out relay contact" terminal and the other side of contact 28 is connected to an internal +300 volts source of voltage by connection 34. The other side of contact 26 is connected to the bridge portion of the bridge and stepping switch circuit 22. The functioning of the control relay 23 will be hereinafter more fully described in connection with the description of the operation of the entire system.

The digital voltmeter 3 measures the input voltage selected by the stepping switch 13 to five places and converts that voltage to digital form by means of five decades 35, 36, 37, 38 and 39. It will be understood that our invention is not limited to the use of a digital meter which converts the input parameter to five place digital form, but on the contrary the digital meter may be arranged to convert the input parameter to any practical number of places, depending upon the resolution accuracy desired. The five decades here shown respectively have ten output circuits 40, 41, 42, 43 and 44, and thus with a suitable potential such as +28 volts applied to the power terminal 45 from connection 46 and assuming a test voltage of 01234 volts applied to the digital voltmeter 3 by connection 4 from the stepping switch 13, the first output circuit 40a of the first decade 35, the second output circuit 41a of the second decade 36, the third output circuit 42a of the third decade 37, the fourth output circuit 43a of the fourth decade 38 and the fifth output circuit 44a of the fifth decade 39 will respectively be energized with 28 volts. The digital voltmeter 3 further provides polarity information, a positive polarity of the test voltage being indicated by energization of output circuit 168 with 28 volts whereas a negative polarity of the test voltage will be indicated by energization of output circuit 189 with 28 volts. Our invention is equally usable for the measurement and evaluation of alternating current voltages and in this event, output circuits 168 and 189 of digital voltmeter 3 may be employed to indicate the presence or absence of an alternating current voltage of the desired frequency.

The digital comparator or coincidence scanner 5 includes a stepping switch 47, six logic relays 48, 49, 50, 51, 52 and 53, evaluating, unlatching, and tape disabling relays 54, 55 and 56 and voltmeter enable relay 153. The programmer 7 takes the form of a punched tape reader including tape reading contacts 57, 58, 59, 60 and 61 cooperating with punched tape 62.

The stepping switch 47 includes seven levels 63, 64, 65, 66, 67, 68 and 69 each having eleven contacts with the eleventh contact being the home position. It will be seen that the polarity output circuits 168 and 189 are respectively connected to the eleventh or home contacts of the stepping switch levels 63 and 64, while the output circuits 40 through 44 of the five decades 35 through 39 are respectively connected to the first through tenth contacts of stepping switch levels 65 through 69. Stepping switch 47 is actuated by an operating coil 70 and also has normally open contacts 71 and 72 and normally closed contacts 73 and 74 associated therewith; the contacts 71 through 74 are in the positions shown only in the eleventh or home position of the stepping switch 47, contacts 73 and 74 being opened and contacts 71 and 72 being closed by cam 220 responsive to movement of the stepping switch 47 away from the home position 11, and remain so in positions (1) through (10) inclusive.

The tape reader 7 is the device whereby the test is automatically programmed and the acceptable limits for the measured voltage are automatically provided for digital comparator 5. These functions are accomplished by "reading" a punched tape 62 which is punched in any one or all five channels at any discrete point on the tape. The tape 62 moves through the reader 7 in a start-stop fashion, so that each row of holes is read individually and consecutively.

The punched tape 62 is driven by a suitable motor 75 adapted to be connected for energization from a suitable source of external power (not shown) such as one hundred fifteen (115) volts alternating current, by leads 76. An electromagnetic clutch 77 having an actuating coil 78 connects motor 75 to the reeling mechanism of the punched tape 62. Clutch 77 is of the type which provides one complete rotation of shaft 82 each time coil 78 is pulsed. A pair of contacts 79 and 80 are provided respectively opened and closed by a suitable cam 81 on the shaft 82 of motor 75; it will thus be seen that contacts 79 will be opened and contacts 80 closed when clutch 77 is energized responsive to each revolution of the motor shaft 82. Clutch actuating coil 78 is serially connected with contacts 79 between a point 83 and the positive side of a source of ninety (90) volt potential. Point 83 is in turn connected to the read-out common terminal 30 of the digital voltmeter 3 by a connection 84.

The punched tape 62 has suitable holes, as will be hereinafter more fully described, punched in five columns or rows 85 through 89 (Fig. 3) respectively in alignment with the punched tape reader contacts 57 through 61. Tape reader contacts 57 through 61 are respectively actuated by pins 110a through 110e when the same are caused to move through holes in punched tape 62 by means of cams 109a through 109e, respectively on drive shaft 82. Drive shaft 82 additionally intermittently advances tape 62 by means of multilated gear 123 cooperating with gear 124 which in turn drives the tape reeling mechanism. It is thus seen that each rotation of the drive shaft 82 will, through cooperation of multilated gear 123 and gear 124 cause tape 62 to advance one position and to remain in that position for a finite period. It will also be seen that cams 109a through 109e are arranged to actuate pins 110a through 110e during the intervals when the tape 62 is not moving and in the event that a hole is provided in tape 62 coinciding with a particular pin 110a through 110e, actuation of the pin by the respective cam 109 will cause the pin to move through the hole in the tape, this movement in turn closing the respective contacts 57 through 61. It will be seen, however, that the interval during which a particular pin 110 is caused to project through the hole in tape 62 by actuation by a cam 109 is only momentary since, as drive shaft 82 continues to rotate and the respective cam 109 in turn rotates, the respective pin 110 will drop to its normal position thus opening the respective contacts 57 through 61. Thus, contacts 57 through 61 inclusive, are only momentarily closed responsive to coincidence of holes in the tape 62 with the pins 110a through 110e in any given tape position. It will be readily understood that in the event no hole is provided in the tape 62 in any given tape position coinciding with a pin 110, rotation of the respective cam 109 will merely exert force on the respective spring 221 and the respective pin 110 is restrained from movement by the unpunched portion of the tape so that the respective contacts 57 through 61 do not close. It will also be seen that the tape reader contacts 57 through 61 of tape reader 7 respectively include main contacts 90 through 94 and auxiliary contacts 111 through 115, each pair of main and auxiliary contacts being respectively closed and opened simultaneously responsive to movement of the respective pin 110 into and subsequently out of the respective hole in tape 62. It will now be understood that with each pulse of voltage to the actuating coil 78 of clutch 77 responsive to closing of the contacts 79, drive shaft 82 actuates gears 123 and 124 to move tape 62 so that one row of holes moves over the reading pins 110a through 110e; in this position, the reading pins 110a through 110e rise under the influence of the cams 109a through 109e, read the row of holes by closing contacts 57 through 61 where holes respectively appear, and then fall back to their normal positions thus opening all of the contacts preparatory to the next pulse to the clutch 77. Tape reading devices are commercially available and thus the tape reader 7 is shown by way of example only and does not form a part of our invention, per se.

Main contacts 90 of tape reader contacts 57 are serially connected between wiper arm 98 of level 65 of step switch 47 and operating coil 103 of logic relay 49 by connection 95. The other side of the operating coil 103 of logic relay 49 is connected to ground, as shown, and thus, assuming that the wiper arm 98 of the level 65 of step switch 47 's moved to its first position thus connecting circuit 40a of the first decade 35 of digital voltmeter 3, and further assuming that the first digit of the measured voltage is zero and that a suitable hole 192 (Fig. 3) appears in the first row 85 on the punched tape 62, contacts 90 of tape reader contacts 57 will be permitted to close thus energizing operating coil 103 of logic relay 49. Tape reader contacts 58, 59, 60 and 61 likewise include main contacts 91, 92, 93 and 94 respectively serially connected between wiper arms 99 through 102 of levels 66 through 69 of stepping switch 47 and operating coils 104 through 107 of logic relays 50 through 53 by connections 108a through 108d respectively. The other ends of the operating coils 104 through 107 of the logic relays 50 through 53 are likewise connected to ground as shown.

Auxiliary contacts 111 of tape reader contacts 57 are referred to as the "synchronizing" contacts. It will now be seen that the operating coil 70 of stepping switch 47 has one end 116 connected to ground with its other end 117 being serially connected through contacts 73, connection 118, synchronizing contacts 111, connection 119, contacts 74, and connections 120 and 122 to the positive side of a suitable source of potential (not shown), such as 28 volts direct current through off-on switch 202. It will further be seen that auxiliary contacts 112 and 113 of tape reader contacts 58 and 59 respectively serially connect the wiper arms 96 and 97 of levels 63 and 64 of stepping switch 47 to the operating coil 125 of logic relay 48 by means of connection 126, the other end of the operating coil 125 being connected to ground as shown.

Logic relays 49 through 53 respectively have normally open sealing contacts 127 through 131 respectively connected between the high potential sides of the operating coils 103 through 107 and connection 121. It will now be seen that a series circuit is established from the source of positive twenty-eight volt potential through contact 202 of the on-off switch, through connections 122, normally open contacts 72 and connection 121 to the sealing contacts 127 through 131 of the logic relays 49 through 53. Thus, if the stepping switch 47 is moved away from its home position, contact 72 of the stepping switch 47 will be closed as explained previously and each of the logic relays 49 through 53, when energized, closing its respective sealing contacts 127 through 131, will seal itself in through contact 72 so that the respective logic relay will remain energized with its contacts picked up even though the tape reader main contacts 90 through 94 which initially caused energization of the particular logic relay are subsequently opened.

Logic relay 48 has contacts 132 connected in series circuit between the high potential end of the operating coil 125 and the positive side of the source of 28 volt potential by connection 133, normally closed contacts 134 of unlatching relay 55, connection 135, normally closed contacts 136 of restarting switch 137 and connection 122. Thus, when wiper arms 96 and 97 of level 63 and 64 of stepping switch 47 are in position 11 (home) thereby to receive a positive or negative polarity signal from the digital voltmeter 3, and if either tape reader contacts 112 (for positive polarity) or 113 (for negative polarity) are at that time closed by virtue of a corresponding hole in rows 86 or 87 of tape 62 thereby to energize operating coil 125 of logic relay 48, contacts 132 will seal in operating coil 125 if contacts 134 of unlatching relay 55 and 136 of restarting switch 137 are closed.

Logic relays 48 through 53 are also respectively provided with evaluating contacts 138 through 143 respectively serially connected by connections 203 and 204 between operating coil 144 of evaluating relay 54 and connection 135. It is thus seen that if each of the logic relays 48 through 53 is energized thereby closing the corresponding evaluating contacts 138 through 143 and if the normally closed contact 136 of restarting switch 137 is also closed, operating coil 144 of evaluating relay 54 will be energized from the positive source of twenty-eight volt potential through connection 122, contacts 136, connection 135, connection 203, evaluating contacts 138 through 143, and connection 204.

Auxiliary contacts 114 and 115 of tape reader contact 60 and 61, referred to respectively as the "evaluate" and "unlatch" contacts, respectively have one side connected to contact 74 of stepping switch 47 by a connection 119. The other side of the evaluate contact 114 is connected to one side of normally closed contact 145 and also to one side of normally open contact 146 of unlatch relay 55 by connection 148. The other side of contact 146 is connected to point 149 by connection 150. Point 149 is connected to one contact 151 of double throw stop switch 147 and also to one side of operating coil 152 of digital voltmeter relay 153 by connection 154. Operating coil 152 of digital voltmeter enable relay 153 is also connected to operating coil 20 of stepping switch 13 by connection 21, as shown. The other side of contact 145 of unlatch relay 55 is connected to one side of normally closed contact 155 and normally open contact 156 of the evaluate relay 54 with the other side of contact 155 being connected to the other contact 157 of stop switch 147 by connection 158 and the other side of contact 156 being connected to the switch arm 159 of stop switch 147 by connection 160. The other side of normally closed contact 155 of evaluate relay 54 is also connected to one side of the operating coil 161 and one side of normally open contact 163 of tape disable relay 56 by connection 162.

The "unlatch" contacts 115 of the tape reader contact 61 are serially connected between connection 119 and the operating coil 164 of the unlatch relay 55 by connection 165. Evaluate relay 54 is sealed in by normally open sealing contacts 166 connected between the high potential side of the operating coil 144 and connection 133. Operating coil 164 of unlatch relay 55 is likewise sealed in by means of normally open sealing contacts 169 serially connected between the high potential side of operating coil 164 and conductor 119 by means of connection 167.

A "GO" pilot lamp 170 is adapted to be connected between connection 120 and 122 and ground by normally open contacts 171 of evaluate relay 54. Normally closed contacts 172 of evaluate relay 54 are connected between connections 120 and 122 and one side of normally open contact 173 of tape disable relay 56 by connection 174. The other side of contacts 173 are serialy connected with "NO-GO" pilot light 175 to ground by connection 176.

The minus side of the ninety (90) volt source of potential is connected by a connection 177 to one side of normally closed contact 178 on the tape disable relay 56, the other side of the contact 178 being connected to one side of normally closed contacts 179 of the restart switch 137 by a connection 180. The other side of contact 179 of restart switch 137 is connected to the digital voltmeter 3 terminal 33 by connection 181. One side of normally open contact 182 of tape disable relay 56 is connected to point 83 on one side of the cam actuated contact 79 associated with reader drive shaft 82 by a connection 183 and the other side of contact 182 is connected to the stepping switch common terminal 32 of the digital voltmeter 3 by a connection 184. The other side of contact 163 of tape disable relay 56 is connected to connection 135 by a connection 185. Normally open contact 186 of restart switch 137 when operated connects the switch arm 159 of stop switch 147 to connection 122 and the positive side of the source of twenty-eight volt potential.

Normally open contacts 187 of the digital voltmeter enable relay 153 are connected between connection 183 and the relay common terminal 31 of digital voltmeter 3 by a connection 188.

The programming of our system is accomplished in the specific embodiment shown by means of the five-channel punched tape 62, a typical segment of which is shown in Fig. 3. A cycle of operation consists of a synchronization command, a polarity comparison, a digital comparison, an evaluate command, and an unlatch (completed test) command. All of these functions except the digital comparison take place with the stepping switch 47 of Fig. 2A in its eleventh or "home" position. During the digital comparison, the stepping switch 47 and the tape 62 are being moved in synchronization and at this time, the columns 85 through 89 of Fig. 3 correspond to the decades 35 through 39 in the read-out section of the digital voltmeter 3 and to the levels 40 through 44 of the stepping switch 47 in Fig. 2A. The positions 1 through 10 of tape 62 correspond to digits 0 through 9 for each voltmeter decade and the terminals 1 through 10 of the associated levels of the stepping switch 47. Referring specifically to Fig. 3, the segment of punched tape 62 shown is punched for evaluating a voltage of +01235±one digit which requires acceptance of the integers +01234, +01235 and +01236. In the sample tape shown, hole 190 in the "sync" tape position and in the first column 85 thereof is a synchronizing hole which cooperates with the synchronizing contacts 111 of Fig. 2A and hole 191 is a polarity hole in the second column 86 and also in the "sync" tape position which cooperates with polarity contact 112. Since the first digit of the required voltage is zero (0), and since the first position of the level 65 of the step. switch 47 cooperating with the first decade 35 represents zero (0), hole 192 is punched in the first column of tape 62 in the number 1 tape position thereof. If, on the other hand, the first digit of the required voltage had been one (1) instead of zero (0), hole 192 would have been punched in the number 2 position of tape 62 rather than number 1. It is thus seen that since the second, third and fourth digits are respectively one, two and three, hole 193 is punched in the second column 86 in the number 2 tape position, hole 194 is punched in the third column 87 in the number 3 tape position, and hole 195 is punched in the fourth column 88 in the number 4 tape position. Since the fifth digit of the required voltage has a permissible tolerance of 4 to 6, holes 196, 197 and 198 are punched in the fifth column 89 in the number 5, 6 and 7 tape positions respectively; if no tolerance were permitted in the fifth decade, as for example the required voltage had been exactly +01236 volts, only hole 198 would have been punched in column 5 in the number 7 tape position. Hole 199 in the fourth column in the "evaluate" position, is an evaluate hole, cooperating with evaluate contacts 114 of the tape reader. Hole 200 in the fifth tape column following hole 199 is an unlatching hole cooperating with the unlatch contacts 115 of the tape reader. A complete scan of a test voltage is thus effected between the synchronizing and polarity holes 190 and 191 in the initial "sync" tape position and the unlatching hole 200 in the "unlatch" tape position. The next scan of the next successive test voltage is thus initiated by another synchronizing hole 190a in the next initial "sync" tape position, and a suitable polarity hole 201 either in the second column in the case of a positive polarity or in the third column in the case of a negative polarity, as the case may be.

Assuming now that the system of Figs. 2A and 2B is to be employed in testing a plurality of voltages, connector 17 at the end of cable 16 will be plugged into a suitable mating connector on the equipment to be tested, thereby connecting the test points to the contacts of the step switch 13. A tape 62 is then inserted into the tape reader 67, the tape being suitably punched for evaluation of the required voltages, for example as shown in Fig. 3. The on-off switch 202 is next closed to connect the twenty-eight (28) volt power to the system, it being observed that at this point, none of the relays are picked up and both of the stepping switches 13 and 47 are at their home positions. Push-button switch 147 is in normal position with switch arm 159 connected to contact 151 and restart switch 137 is momentarily operated thereby to close and open contacts 186; during the brief interval that the restarting contacts 186 are closed, a circuit is established between the positive side of the source of twenty-eight (28) volt potential, switch 202, contacts 186 of restart button 137, switch 147, point 149, connection 154, and connection 21 to operating coil 20 of the circuit selecting step switch 13. Operating coil 20 of step switch 13 is thus energized and deenergized thereby to move wiper arm 18 away from its home position 19 to its first position 14a thereby connecting the first test voltage to the digital voltmeter 3 through connection 4.

Operating coil 24 of control relay 23 is initially deenergized, however, during a normal voltmeter reading cycle, operating coil 24 is energized by the rectified up-or-down pulses generated by the internal circuits of the voltmeter. It will be observed that the momentary depression of restart switch 137 and the consequent closing of the contacts 186 causing energization of line 154 with +twenty-eight (28) volts, in addition to energizing operating coil 20 of the circuit selecting step switch 13, also momentarily energizes operating coil 152 of digital voltmeter enable relay 153 thereby to close contacts 187. It will now be observed that starting with contact 34 of the digital voltmeter 13 which is connected to a source of +three hundred (300) volts; a circuit is provided through normally closed contacts 28 of control relay 23, the operating coil 24, external terminal 31, line 188, contacts 187 of digital voltmeter enable relay 153, line 183, line 84, external terminal 30 of digital voltmeter 3 and thence back to ground. Thus, during the momentary depression of the restart switch 137, operating coil 24 of digital voltmeter control relay 23 is energized thereby to pick up the relay; picking up of control relay 23 of digital voltmeter 3 closes contacts 26 and 25 thus providing a circuit, starting with the ground shown within the digital voltmeter 3, through contact 25, operating coil 24, contacts 26 and thence to the bridge of step switch circuit 22 and during the subsequent voltage measuring operation, the above referred to rectified up-and-down pulses keep the operating coil 24 of relay 23 energized and thus keep the relay 23 picked up. After the voltage appearing at the position 14a of the circuit selecting step switch 13 has been completely measured and a stabilized reading obtained, the rectified up-and-down pulses cease, the operating coil 24 is deenergized, and relay 23 is thus dropped out. By this time, however, restart button 137 has long since been released so that contacts 186 are opened and there is thus no circuit providing for external energization of operating coil 24 of control relay 23.

It will now be observed that a circuit is available starting with the positive side of the ninety (90) volt source of power through actuating coil 78 of clutch 77, contact 79 associated with cam 81 on drive shaft 82, point 83, connection 84, external terminal 30 of digital voltmeter 3, contacts 29 of control relay 23, external terminal 33, connection 181, normally closed contacts 179 of restart switch 137, normally closed contacts 178 of tape disable relay 56, and connection 177 back to the minus side of the source of ninety (90) volt potential. Momentary depression of the restart switch 137, as heretofore described, resulting in picking up of the control relay 23 of the digital voltmeter 3, with that relay being subsequently held in during the voltage measuring operation, opens contact 29, however, thus breaking the recited circuit so that clutch coil 78 cannot be energized. As soon as the digital voltmeter 3 completes its first voltage measurement operation, however, operating coil 24 of control relay 23 is deenergized, thus dropping out the relay and closing contact 29 to establish the above recited circuit for energizing clutch coil 78. Clutch coil 78 is thus alternately energized and deenergized, i.e., pulsed, responsive to opening and closing of contact 79 by action of the cam 81 thereby to advance the tape 62 and synchronizing hole 190 of Fig. 3 permits closing of synchronizing contacts 111. It will here be recalled that contacts 73 and 74 of the stepping switch 47 are closed in the home position of the stepping switch and thus, with synchronizing contacts 111 momentarily closed by virtue of hole 190 in tape 62, as shown in Fig. 3, a momentary circuit is established starting with the source of +twenty-eight (28) volt potential through switch 202, connection 122, connection 120, contact 74 of step switch 47, connection 119, synchronizing contact 111, connection 118, contacts 73 of step switch 47, connection 117 and operating coil 70 of the step switch 47. This connection thus energizes and deenergizes operating coil 70 of step switch 47 from the source of twenty-eight (28) volt potential thus causing the wiper arms 96 through 102 of the levels 63 through 69 of step switch 47 to move off of their home position and to their first position; it will be understood that the step switch 47 moves away from its home position 11 to its position 1 only after the tape reader contacts open thus deenergizing the operating coil 70 of step switch 47. It will also be recalled that movement of the wiper arms of the step switch 47 away from their home position opens the contacts 73 and 74 and closes contacts 71 and 72, contacts 71 and 72 remaining closed in all positions of the step switch 47 other than the home position. It should now be observed that in the sync position of tape 62 there is also provided polarity hole 191 in the second column which thus cooperates with polarity contacts 112. Thus, if the voltage appearing on position 14a of the circuit selecting step switch 13 and in turn impressed on the digital voltmeter 3 through connection 4 is of positive polarity as required by hole 191, digital voltmeter 3 will provide twenty-eight (28) volts in its output circuit 168 connected to the home position of level 63 of step switch 47. With contacts 112 being closed by virtue of the appearance of hole 191 in the second column of the tape 62, a circuit is established from output circuit 168 of digital voltmeter 3, wiper arm 96 of level 63 of step switch 47, polarity contacts 112 of the tape reader, connection 126, and operating coil 125 of polarity logic relay 48 and thus polarity relay 48 is picked up from the twenty-eight (28) volt potential provided in the output circuit 168 of digital voltmeter 3. Picking up of the polarity relay 48 causes closing of its sealing contacts 132 and thus polarity relay 48 is sealed in by a circuit starting with the source of twenty-eight (28) volt potential, connection 122, contacts 136 of the restart switch 137, connection 135, normally closed contacts 134 of the unlatch relay 55, connection 133, and sealing contacts 132 of the polarity relay 48. Picking up of the polarity relay 48 also closes the logic contacts 138.

It should be noted that the polarity evaluation takes place simultaneously with the synchronizing function but is completed prior to advancement of the step switch 47 from its home (11) position to its first position. It will now be seen that whereas operating coil 70 of step switch 47 was initially energized to move the step switch from its home to its first position through its own normally closed contacts 74 and 73 and closing of the synchronizing contacts 111, operating coil 70 is now successively energized and deenergized responsive to opening and closing of contacts 80 by operation of cam 81 on drive shaft 82, the circuit being from the operating coil 70, connection 117, contacts 71, contacts 80, connection 120, and connection 122 to the source of positive twenty-eight (28) volt potential. Thus, each time that cam 81 opens and closes contacts 79 thereby to advance punched tape 62 one tape position it also opens and closes contact 80 thereby to energize and deenergize operating coil 70 of step switch 47 to advance wiper arms 96 through 102 successively to their next positions.

Wiper arms 96 through 102 of levels 63 through 69 of the step switch 47 are now in their first positions. Positioning of the stepping switch 47 is now controlled by cam actuated contacts 80 and the tape 62 continues to move through the tape reader. When the number 1 position of tape 62 is reached and assuming now that the voltage measured by the digital voltmeter 3 in fact showed a zero (0) voltage in the first decade as required by the tape 62 as shown in Fig. 3, twenty-eight (28) volts will be provided from the first decade 35 on the output circuit 40a which is now contacted by the wiper arm 98. A circuit is thus established from the output circuit 40a associated with the first decade 35, wiper arm 98 of stepping switch 47, main contacts 90 which will close due to hole 192 in tape 62, connection 95 and operating coil 103 of logic relay 49. Relay 49 is thus picked up responsive to the twenty-eight (28) volts provided on the first output circuit 40a of the first decade 35 of digital voltmeter 3 and closing of contacts 90 due to hole 192 of tape 62. Recalling now that movement of the step switch 47 from its home to its first position closed contacts 72, it is seen that operating coil 103 of the first digit logic relay 49 is sealed in through its sealing contacts 127, connection 121, contacts 72, connection 120, and connection 122 to the source of positive twenty-eight (28) volt potential. Picking up of the logic relay 49 likewise closes logic contact 139.

It will now be seen that in the second position of the stepping switch 47 in which hole 193 in tape 62 calls for a second decade indication of one, and the second output circuit 41a of the second decade 36 is energized by the digital voltmeter 3 with twenty-eight (28) volts, operating coil 104 of the logic relay 50 will be energized through contacts 91 of the tape reader being closed by the hole 193; logic relay 50 will likewise seal itself in through its sealing contacts 128 in the same manner as the sealing in of the logic relay 49 and the logic contacts 140 will likewise be closed. Similarly, if in the third and fourth positions of the stepping switch 47, output circuits 42a and 43a of the third and fourth decades 37 and 38 are respectively energized, operating coils 105 and 106 of the third and fourth logic relays 51 and 52 will be picked up, these relays likewise sealing themselves in through their sealing contacts 129 and 130 and closing logic contacts 141 and 142. It will now be observed that holes 196, 197 and 198 in the fifth column of tape 62 and in the number 5, 6 and 7 tape positions indicate that digits of 4, 5 or 6 are acceptable and thus, if in any of its fifth, sixth or seventh positions, wiper arm 102 of level 69 of the stepping switch 47 finds a twenty-eight (28) volt potential on any of the fifth, sixth or seventh output circuits 44a, 44b or 44c, since tape reader contacts 94 are closed in all three positions responsive to holes 196, 197 and 198 of tape 62, operating coil 107 of the fifth digit logic relay 53 will be energized and relay 53 will thus pick up and seal itself in through its own contacts 131 with the logic contacts 143 also being closed.

Assuming now, as was the case just described above, that the voltages appearing respectively on the output circuits 40 through 44 of the first through fifth decades 35 through 39 of the digital voltmeter 3, corresponded with those required by the holes punched in tape 62 so that all of the logic contacts 138 through 143 are closed, it will be seen that a circuit is established starting with the source of twenty-eight (28) volt potential, connection 122, normally closed contact 136 of restarting switch 137, connection 203, the serially connected closed logic contacts 138 through 143, and connection 204 to operating coil 144 of the evaluate relay 54. Relay 54 thus picks up closing its sealing contacts 166 thereby to seal in its operating coil 144 through connection 133, normally closed contacts 134 of unlatch relay 55, connection 135, normally closed contacts 136 of restart switch 137, and connection 122 to the positive source of twenty-eight (28) volt potential. It will further be observed that picking up of the evaluate relay 54 closes contacts 171 thereby illuminating the "GO" lamp 170 from connection 122 and the positive source of twenty-eight (28) volt potential.

Tape 62 now continues to advance by virtue of opening and closing of cam contact 79 and the step switch 47 continues to advance until it again reaches its eleventh or home position. In the eleventh position, evaluate hole 199 appears in the fourth column thus closing the evaluate contacts 114. It will now be recalled that in the eleventh position of the step switch 47, contacts 71 and 72 are open and 73 and 74 are closed. Thus, a circuit is established starting with the source of positive twenty-eight (28) volt potential through connection 122, connection 120, contact 74 of stepping switch 47, connection 119, the evaluate contacts 114 cooperating with the evaluate hole 199 in the tape 62, connection 148, normally closed contact 145 of the unlatch relay 55, contact 156 of the now picked up evaluate relay 54, connection 160, switch 147, point 149, and connection 154 to energize operating coil 152 of digital voltmeter enable relay 153 and also to energize operating coil 20 of circuit selecting stepping switch 13. Energization of the operating coil 152 of the digital voltmeter enable relay 153 closes contacts 187 and a circuit is thus established from the internal three hundred (300) volt source of the digital voltmeter 3 through contacts 28, operating coil 24, external terminal 31, connection 188, now closed contacts 187, connection 183, connection 84, external terminal 30 of digital voltmeter 3, and thence to the internal ground, as shown, thereby to energize operating coil 24 and to pick up control relay 23 to permit reading of the next voltage. It will be observed that the logic relays 49 through 53 were sealed in through contact 72 of stepping switch 47 and thus, when stepping switch 47 reached its home position, corresponding to the evaluate position of tape 62, contact 72 is opened thereby dropping out the logic relays 49 through 53.

Energization of operating coil 20 of the stepping switch 13 advances the wiper arm 18 to the next switch position, thereby to receive the next test voltage. Picking up of the control relay 23 of the digital voltmeter 3 opened the contacts 29 thus breaking the ninety (90) volt circuit of the clutch coil 78 thereby stopping advance of the tape 62 at hole 199. When the voltage reading has been completed, as heretofore described, and the control relay 23 of digital voltmeter 3 drops out thereby closing contacts 29 again to initiate advance of the tape 62, unlatch hole 200 in column 5 will cause tape reader contacts 115 to close. A circuit is now established beginning again with a source of twenty-eight (28) volt potential, connection 122, connection 120, contact 74, connection 119, the unlatch contacts 115 operated due to the hole 200 in the tape 62, connection 165, and operating coil 164 of unlatch relay 55. Unlatch relay 55 is thus picked up closing its sealing contacts 169 which it will be observed are energized from line 119 by virtue of connection 167. It will now further be observed that the operating coil 144 of the evaluate relay 54 was sealed in through normally closed contacts 134 of the unlatch relay 55 and thus, when the unlatch relay 55 is picked up, contacts 134 are opened thereby to drop out the evaluate relay 54 and to restore the original condition of the relay for the next scan. Polarity relay 48, it will be observed, was sealed in by the same circuit as evaluate relay 54, i.e., through normally closed contact 134 of unlatch relay 55, and thus picking up of the unlatch relay 55 and opening of its contacts 134 responsive to the unlatch hole 200 in tape 62 drops out the polarity relay 48. Thus, movement of the stepping switch 47 to its final position 11 at the conclusion of one scan drops out logic relays 49 through 53 and the resulting movement of the tape to unlatch hole 200 drops out evaluate relay 54 and polarity relay 48. It will be seen that the next movement of step switch 47 away from the home position to its first position will open contacts 74 and thus drop out the unlatch relay 55. The evaluate hole 199 may be spaced any desired number of positions beyond position 10 of the tape, however, in the illustrated embodiment it must always appear in the fourth channel. Likewise the unlatch hole 200 and the sync and polarity holes 190a and 201 may be spaced at any desired position beyond the preceding unlatch hole 200. It is this feature which provides the selectable time base with respect to incremental time delay between programmed tests.

It will now be seen that if the digital data representing the voltage measured by the digital voltmeter finds agreement with the digital data representing the required voltage as called for by the corresponding scan of the tape 62, a "GO" indication will be provided by illuminating the lamp 170 and the circuit selector 2 will advance to its next position to apply the next test voltage to the digital voltmeter 3. Thus, so long as the voltages successively measured are not outside of the required tolerances, the system will automatically proceed to select, measure and evaluate each test voltage successively. It will, of course, be readily understood that the step switch 13 may be provided with as many levels and transfer relays as is practical or that in fact more than one step switch may be utilized in the circuit selector as is well known in the art. Thus, in an actual device constructed in accordance with the circuits of Figs. 2A and 2B, the step switch 13 was arranged successively to connect one hundred ninety-nine (199) lines to the digital voltmeter 3. Digital meter enable relay 153 is designed for slow release in order to provide some time delay in the opening of the contacts 187, thus enabling the circuit selector 2 to advance to the next position applying a new voltage to the voltmeter 3 and subsequently assuring that the up-and-down pulses provided by the bridge circuit 22 of the digital voltmeter 3 are available to keep the operating coil 24 of the control relay 23 energized; since the wiper 18 of circuit selector step switch 13 does not move until its coil 20 is deenergized subsequent to application of 28 volts, the up-and-down pulses will not be generated in the digital voltmeter 3 until the coil 20 is deenergized and therefore a time delay is provided across coil 152 of relay 153 in order to hold the digital voltmeter control relay 23 closed until a new voltage appears at the voltmeter input connection 4.

Assuming now that all of the logic relays 48 through 53 were not picked up at the end of a particular scan, for example, assuming that with the tape in its position number three and with hole 194 calling for a digital value of two, circuit 42b of the third decade 37 rather than circuit 42a was energized with twenty-eight (28) volts thus showing that the voltage actually measured had a third digit value of one (1) rather than two (2) as required. In this case, the third logic relay 51 would not be energized since when the tape reader contacts 92 were closed by virtue of the hole 194 in tape 62, wiper arm 100 of level 67 of step switch 47 contacting circuit 42a would find no voltage thereon, and thus logic contact 141 of the logic relay 51 would not be closed. Thus, since all of the logic contacts 138 through 143 were not closed at the end of the scan, the evaluate relay 54 would not be picked up. It is thus seen that when the tape 62 advances to its evaluate position so that the evaluate hole 199 closes evaluate contact 114, a circuit is established starting with a source of twenty-eight (28) volt potential, connection 122, connection 120, contact 74, connection 119, the evaluate contacts 114 of the tape reader, connection 148, contact 145 of the unlatch relay 55, contacts 155 of the deenergized evaluate relay 54, and connection 162 to operating coil 161 of the tape disable relay 56. Tape disable relay 56 thus picks up and is sealed in through its own contacts 163, connection 185, connection 135, normally closed contacts 136 of restart switch 137 and connection 122 to the source of positive twenty-eight (28) volt potential. Closing of contact 173 of the tape disable relay 56 causes illumination of the "NO-GO" lamp 175 through connection 176, contact 173, connection 174, contact 172 of the deenergized evaluate relay 54, and connection 122 to the source of positive twenty-eight (28) volt potential.

It will now be recalled that normally closed contact 178 of the tape disable relay 56 was in series with connection 177 and thus with the negative side of the ninety (90) volt circuit by which clutch coil 78 is energized and thus, when the tape disable relay 56 is picked up, contact 178 is opened thus deenergizing clutch coil 78 and prohibiting further advance of the tape 62. With the tape reader stopped and the "NO-GO" lamp illuminated, it is now desirable again to actuate the digital voltmeter 3 so that a technician can locate the cause of the out-of-tolerance voltage and make a suitable adjustment so as to bring the voltage up or down, as the case may be, to the desired level. Thus, contact 182 of tape disable relay 56 closes establishing a circuit starting with the internal ground within the digital voltmeter 3, external terminal 30, connection 84, point 83, and connection 183, contact 182 of tape disable relay 56, connection 184, and external terminal 32 to the step switch 22 within the digital voltmeter 3. Thus, on a "NO-GO" reading, the digital voltmeter 3 is enabled to permit adjustment of the voltage. As indicated hereinbefore, tape 62 may have printed thereon adjacent evaluate hole 199 an indication of the component in the apparatus being tested which should be adjusted in order to correct the condition which caused the "NO-GO" reading, together with the voltage which should be obtained on the digital voltmeter 3 by such adjustment; such an indication is shown at 222 on the tape 62 in Fig. 3. Thus, assuming that the test called for in the section of tape in Fig. 3 was being conducted and a "NO-GO" reading obtained with a consequent stopping of the tape, the operator can inspect the indication 222, adjust the indicated potentiometer until the digital voltmeter 3 provides a reading of 01235 volts (commercially available digital voltmeters provide a visual indication of the voltage being measured as well as an electrical digital output). When the required voltage has been obtained, the restart switch 137 is depressed momentarily closing contact 186 and thus establishing a circuit through contact 186, start switch 147, point 149, connection 154 and connection 21 to energize operating coil 20 of circuit selecting step switch 13 and operating coil 152 of the digital voltmeter enable relay 153 thereby causing the circuit selector to move on to the next test voltage and the digital voltmeter 3 to start measurement of that voltage, the sequence of operation then proceeding as described above.

It may be desirable in certain instances to so program the testing that certain test positions are omitted, and it is therefore necessary suitably to punch the tape 62, as shown for example in Fig. 4, so that the tape will advance the circuit selector without a digital comparison. To accomplish this, an "unlatch" hole 200 is provided in the fifth column of the tape 62 followed by an "advance" hole 217 in the fourth column. When the tape advances to unlatch hole 200, unlatch relay 55 is energized and seals on its own contacts 169. The tape will continue to advance, until the "advance" hole 217 in the fourth column of tape 62 operates evaluate contacts 114. A circuit is therefore provided by evaluate contacts 114, starting with connection 119, through contacts 146 of the now picked up unlatch relay 55, connection 150, connection 154 and connection 21 to energize operating coil 152 of digital voltmeter enable relay 153 and operating coil 20 of circuit selector stepping switch 13 thereby causing the circuit selector to move to the next position to receive the next test voltage and enabling the digital voltmeter to measure that voltage. The subsequent functioning of the system is identical to that previously described.

It may be possible that the permissible tolerance in a required voltage is greater than can be programmed in one scan of the tape 62, thus, referring to Fig. 5, a required voltage is assumed having a permissible range from —51835 through —51845. Thus in the first scan of the tape 62, the synchronizing hole 190 is found in the "sync" position, first column, and it will be observed that polarity hole 205, since a minus polarity is required, now appears in column 3. The first digit being five (5), hole 206 appears in the sixth tape position in the first column and holes 207 and 208 appear in the second and ninth positions respectively of the second and third columns representing the second and third digits of one (1) and eight (8) respectively. Since the combination of the fourth and fifth digits range from three five (35) to four five (45), it will be seen that with hole 209 punched in the fourth position, fourth column, representing the fourth decade digit value of three (3), fifth decade digit values of only five, six, seven, eight and nine can be scanned in this scan of the tape 62. Thus, holes 210, 211, 212, 213 and 214 appear in tape positions six through ten and in the fifth column. Now, if the voltage measured falls within the range of —51835 to —51839, the logic relays 48 through 53 will all pick up, thus energizing and sealing in the evaluate relay 54. However, as explained above, if for example the voltage measured is —51840, coincidence will not be found in the fifth decade and the last logic relay 53 will not pick up. However, no evaluate hole is provided at this time and thus the tape will continue to advance to "sync" position for the second scan where synchronizing hole 190a appears. The previously picked up logic relays 49, 50, 51 and 52 have, however, been dropped out by virtue of the opening of off-normal contact 72 caused by step switch 47 moving to its home position, and thus the second appearance of holes 206a, 207a, 208a, and 209a will again energize logic relays 49 through 52. Now, however, with the assumed measured voltage of —51840, the appearance of hole 215 in the first tape position, fifth column will pick up logic relay 53 and thus cause energization of the evaluate relay 54. The remaining holes 216 in tape positions two (2) through six (6), column 5, in the second scan, complete the tolerance requirement down to the digit five. Since two scans are sufficient to evaluate the voltage range specified, evaluate hole 199 is provided at the end of the second scan as shown in the "evaluate" position. If coincidence of the required voltage and the measured voltage had in fact been found during the first scan, the evaluate relay 54 would have picked up and sealed in and would have remained sealed in even through the logic relays previously picked up were dropped out by movement of the step switch 47 off of the home position and thus subsequent picking up of the logic relays during the second scan would have no effect, the evaluate pulse provided by hole 199 at the end of the second scan then producing the sequence of operation described above in connection with a single scan. It will be readily understood that more than two scans may be provided if desired by merely omitting the evaluate and unlatch holes at the end of the last scan which is sufficient to effect the valuation.

Returning to Figure 2B, operation of the system may be stopped at any time by moving stop switch 147 from contact 151 to contact 157; stop switch 147 in its position 157 diverts the evaluate pulse from the "GO" circuit to pick up the tape disable relay 56. It is thus seen that movement of the stop switch 147 to its position 157 will stop the test after completion of the evaluation then in process; stop switch 147 must be held in its position 157 until the evaluation in process is completed. Testing can be resumed at any time merely by depressing restart button 137.

It will now be seen that we have provided an arrangement for automatically and sequentially determining whether a large plurality of voltages correspond to required tolerance limits, the system automatically proceeding step by step to select, measure and evaluate each successive voltage if each voltage evaluated is found to be within the required tolerance limits, the system further stopping automatic advancement responsive to a "NO-GO" signal with the voltage measuring portion of the system being enabled to permit the adjustment of the input signal to correspond to the desired limits.

While we have described above the principles of our invention in connection with specific apparatus, it is to be clearly understood that this description is made only by way of example and not as a limitation to the scope of our invention.

What is claimed is:

1. A system for automatically and sequentially selecting, measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; and means coupled to said converting means for comparing the output thereof with preselected characteristics and electrical quantities in digital form; said comparing means being coupled to said connecting means and arranged to advance the same to connect said converting means to the next electrical quantity source responsive to an agreement of a converting means output and a corresponding required characteristic and electrical quantity in digital form.

2. A system for automatically and sequentially selecting, measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; means coupled to said converting means for comparing the output thereof with preselected characteristics and electrical quantities in digital form; and programming means coupled to said comparing means for sequentially supplying said preselected characteristics and electrical quantities in digital form thereto; said comparing means being coupled to said connecting means and arranged to advance the same to connect said converting means to the next electrical quantity source responsive to an agreement of a converting means output and a corresponding required characteristic and electrical quantity in digital form.

3. A system for automatically and sequentially selecing, measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; means coupled to said converting means for comparing the output thereof with preselected characteristics and electrical quantities in digital form; and programming means coupled to said comparing means for sequentially supplying said preselected electrical quantities in digital form thereto; said comparing means being coupled to said connecting means and arranged to advance the same to connect said converting means to the next electrical quantity source responsive to an agreement of a converting means output and a corresponding required characteristic and electrical quantity in digital form; said comparing means having another coupling to said programming means for disabling the same responsive to a lack of agreement of a converting means output and a corresponding required characteristic or electrical quantity in digital form.

4. A system for automatically and sequentially selecting measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; means coupled to said converting means for comparing the output thereof with preselected characteristics and electrical quantities in digital form; and programming means coupled to said comparing means for sequentially supplying said preselected characteristics and electrical quantities in digital form thereto; said comparing means being coupled to said connecting means and arranged to advance the same to connect said converting means to the next electrical quantity source responsive to an agreement of a converting means output and a corresponding required characteristic and electrical quantity in digital form; said converting means being coupled to said programming means for initiating operation of the same responsive to completion of a conversion of an electrical quantity to a corresponding digital form.

5. A system for automatically and sequentially selecting, measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; and means coupled to said converting means for comparing the output thereof with preselected characteristics and electrical quantities in digital form; said comparing means being coupled to said connecting means and arranged to advance the same to connect said converting means to the next electrical quantity source responsive to an agreement of a converting means output and a corresponding required characteristic and electrical quantity in digital form; said comparing means having another coupling to said converting means for initiating conversion of the next electrical quantity responsive to completion of a comparison with a resulting agreement of a comparing means output and a corresponding required characteristic and electrical quantity in digital form.

6. A system for automatically and sequentially selecing, measuring and evaluating a plurality of parameters capable of reduction to characteristics and electrical quantities and conversion to digital form comprising: means for converting said electrical quantities to an electrical output in digital form and for providing a visual indication of the quantity being measured; means for sequentially connecting said converting means to a plurality of sources of said electrical quantities; means coupled to said converting means for comparing the output thereof with preselected characteristics and electrical quantities in digital form; and programming means coupled to said comparing means for sequentially supplying said preselected characteristics and electrical quantities in digital form thereto; said comparing means being coupled to said connecting means and arranged to advance the same to connect said converting means to the next electrical quantity source responsive to an agreement of a converting means output and a corresponding required characteristic and electrical quantity; said comparing means having another coupling to said programming means for disabling the same responsive to a lack of agreement of a converting means output and a corresponding characteristic or electrical quantity in digital form; said converting means being coupled to said programming means for initiating operation of the same responsive to completion of a conversion of an electrical quantity to a corresponding digital form; said comparing means having another coupling to said converting means for initiating conversion of the next electrical quantity responsive to completion of a comparison with a resulting agreement of a comparing means output and a corresponding required characteristic and electrical quantity in digital form.

7. A system for automatically and sequentially evaluating a plurality of parameters capable of reduction to corresponding characteristics and voltages comprising: digital voltmeter means for transferring characteristics and for converting voltages to an electrical output in digital form and arranged to provide a visual indication of the voltages being measured; switching means arranged sequentially to connect said digital voltmeter means to a plurality of input circuits respectively having voltages to be tested thereon; digital comparator means connected to receive the digital output of said digital voltmeter means and to compare said output with preselected required characteristics and voltages in digital form; and programming means connected to said digital comparator means and including recorded characteristics and voltages in digital form for supplying the same to said digital comparator means; said digital comparator means being connected to said switching means and arranged to advance the same to connect said digital voltmeter to the next input circuit responsive to an agreement of a digital voltmeter output and a corresponding recorded characteristic and voltage in digital form; said digital comparator means having another connection to said programming means for stopping the same responsive to a lack of agreement of a digital voltmeter output and a recorded characteristic or voltage in digital form.

8. A system for automatically and sequentially evaluating a plurality of parameters capable of reduction to corresponding characteristics and voltages to digital form; digital voltmeter means for transferring characteristics and for converting voltages to an electrical output in digital form and arranged to provide a visual indication of the voltages being measured; switching means arranged sequentially to connect said digital voltmeter means to a plurality of input circuits respectively having voltages to be tested thereon; digital comparator means connected to receive the digital output of said digital voltmeter means and to compare said output with preselected characteristics and voltages in digital form; and programming means connected to said digital comparator means and including recorded characteristics and voltages in digital form for supplying the same to said digital comparator means; said digital comparator means being connected to said switching means and arranged to advance the same to connect said digital voltmeter to the next input circuit responsive to an agreement of a digital voltmeter output and a corresponding recorded characteristic and voltage in digital form; said digital comparator means having another connection to said programming means for stopping the same responsive to a lack of agreement of a digital voltmeter output and a recorded characteristic or voltages in digital form; said digital voltmeter means being connected to said programming means and arranged to initiate operation of the same responsive to completion of a conversion of a voltage to a corresponding digital form; said comparator means having another connection to said digital voltmeter means and being arranged to initiate conversion of the next voltage responsive to completion of a comparison with a resulting agreement of a digital voltmeter output and a corresponding recorded characteristic and voltage in digital form.

9. A system for automatically and sequentially evaluating the voltages on a plurality of circuits comprising: a digital voltmeter having a voltage input circuit and a plurality of output circuit groups each having ten output circuits for converting voltages and characteristic outputs to digital form and arranged to provide a visual indication of the voltages being measured; switching means arranged sequentially to connect said digital voltmeter input circuit to said plurality of circuits; a programmer including a punched tape having a corresponding plurality of required characteristics and voltages recorded thereon in digital form; a plurality of tape reader contacts cooperating with said punched tape; means for sequentially moving said tape through said tape reader for corresponding operation of said contacts; a stepping switch having a plurality of levels corresponding to said digital voltmeter output circuit groups for sequentially connecting said output circuits to said tape reader contacts; a plurality of logic relays connected respectively to said tape reader contacts whereby agreement of a characteristic and a digital output of said digital voltmeter with a required characteristic and voltage as digitally recorded on said tape causes energization of all said logic relays; and other relays connected to said logic relays and said tape reader contacts arranged to establish circuit connections responsive to energization of all of said logic relays for advancing said switching means to connect the next of said plurality of circuits to said digital voltmeter input circuit, said other relays establishing circuit connections to disable said programmer responsive to a lack of agreement of a characteristic or the digital output of said digital voltmeter with a characteristic or voltage as digitally recorded on said punched tape.

10. A system for automatically and sequentially evaluating the voltages on a plurality of circuits comprising: a digital voltmeter having a voltage input circuit and a plurality of output circuit groups each having ten output circuits for converting voltages to an electrical output in digital form and arranged to provide a visual indication of the voltages being measured, said digital voltmeter having two additional output circuits adapted respectively to be energized to indicate positive or negative polarity of the voltage applied to said input circuit; a first stepping switch arranged sequentially to connect said digital voltmeter input circuit to said plurality of circuits; a programmer including a punched tape having a corresponding plurality of voltage and polarity information recorded thereon in digital form; a plurality of tape reader contacts cooperating with said punched tape; drive means for sequentially moving said tape through said tape reader for corresponding operation of said contacts; a second stepping switch having a plurality of levels corresponding to said digital voltmeter output circuit groups for sequentially connecting said output circuits respectively to one of each pair of said tape reader contacts; a plurality of logic relays connected respectively to said tape reader contacts whereby agreement of a digital output of said digital voltmeter with a voltage as digitally recorded on said tape causes energization of all of said logic relays; other relays connected to said logic relays and said tape reader contacts and having contacts arranged to establish a circuit connection for advancing said first stepping switch to connect the next of said plurality of circuits to said digital voltmeter input circuit responsive to energization of all of said logic relays; said digital voltmeter including means connected to said programmer drive means for disabling the same while said digital voltmeter is converting said voltages to digital form; said other relay contacts being arranged to establish circuit connections to disable said programmer drive means responsive to a lack of agreement of polarity or a digital output of said digital voltmeter with a recorded polarity and voltage in digital form when at least one of said logic relays is not energized.

11. The system of claim 9 in which said other relays are arranged to establish circuit connections to enable said digital voltmeter responsive to said lack of agreement.

12. The system of claim 9 in which said punched tape bears indicia thereon visually indicating the adjustment required in the respective circuit of said plurality of circuits being tested to obtain agreement of the characteristic and digital output of said digital voltmeter with the required characteristic and voltage.

13. The system of claim 9 in which said other relays are arranged to establish circuit connections to advance said switching means a predetermined number of steps responsive to punched information on said tape.

References Cited in the file of this patent

UNITED STATES PATENTS 2,798,199     Potter                July 2, 1957

OTHER REFERENCES

Rymsha: "Radio-Electronics," July 1956; pages 55–57.